US012228954B2

(12) United States Patent
Shankar et al.

(10) Patent No.: US 12,228,954 B2
(45) **Date of Patent: *Feb. 18, 2025**

(54) VOLTAGE REGULATOR WAKE-UP

(71) Applicant: TEXAS INSTRUMENTS INCORPORATED, Dallas, TX (US)

(72) Inventors: Ruchi Shankar, Karnataka (IN); Somshubhra Paul, Karnataka (IN); Gaurang Helekar, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 495 days.

This patent is subject to a terminal disclaimer.

(21) Appl. No.: 17/064,480

(22) Filed: Oct. 6, 2020

(65) Prior Publication Data

US 2021/0034089 A1 Feb. 4, 2021

Related U.S. Application Data

(63) Continuation of application No. 14/845,579, filed on Sep. 4, 2015, now Pat. No. 10,795,391.

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ............ G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17; G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; H02M 3/07; H02M 3/073;

(Continued)

(56) References Cited

U.S. PATENT DOCUMENTS 4,823,070 A * 4/1989 Nelson .............. H02M 3/33523 323/299
5,994,885 A 11/1999 Wilcox et al.

(Continued)

FOREIGN PATENT DOCUMENTS

EP 3333581 A1 * 6/2018 ....... G01R 19/16595
WO WO-2019000218 A1 * 1/2019

*Primary Examiner* — Sean Kayes
*Assistant Examiner* — Nusrat Quddus
(74) *Attorney, Agent, or Firm* — Xianghui Huang; Frank D. Cimino

(57) ABSTRACT

A system includes a voltage regulator having an output voltage and a power management system, coupled to the voltage regulator. The power management system operable to determine whether the output voltage is within an active range, set the active range to a first range during a first time, or during a first mode, and set the active range to a second range for a second time, or during a second mode.

20 Claims, 2 Drawing Sheets

(58) Field of Classification Search

CPC ........ H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/19; H02M 7/08; H02M 7/17; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02J 3/46; H02J 3/38

See application file for complete search history.

(56) References Cited

U.S. PATENT DOCUMENTS

| | | | | |
|---|---|---|---|---|
| 6,147,883 | A * | 11/2000 | Balakrishnan | H02M 3/33507 323/315 |
| 6,188,211 | B1 * | 2/2001 | Rincon-Mora | G05F 1/575 323/280 |
| 6,188,212 | B1 * | 2/2001 | Larson | G05F 1/56 323/281 |
| 6,229,289 | B1 * | 5/2001 | Piovaccari | H02M 3/1588 323/273 |
| 6,437,638 | B1 | 8/2002 | Coles et al. | |
| 6,498,467 | B1 * | 12/2002 | Stratakos | G05B 19/0428 323/284 |
| 6,522,111 | B2 * | 2/2003 | Zadeh | G05F 1/575 323/277 |
| 6,601,176 | B1 * | 7/2003 | Alexander | G06F 1/24 713/340 |
| 6,969,981 | B1 * | 11/2005 | Fairbanks | H02M 3/28 323/275 |
| 7,030,596 | B1 * | 4/2006 | Salerno | H02M 3/158 323/282 |
| 7,064,531 | B1 * | 6/2006 | Zinn | H02M 3/1584 323/283 |
| 7,266,709 | B2 | 9/2007 | Chapuis et al. | |
| 7,688,047 | B2 * | 3/2010 | Sugiyama | H02M 3/1584 323/901 |
| 7,795,851 | B2 * | 9/2010 | Ye | H03K 3/0231 323/282 |
| 7,836,322 | B2 | 11/2010 | Chapuis et al. | |
| 8,154,236 | B2 * | 4/2012 | Kimura | H02M 7/4807 318/400.26 |
| 8,154,263 | B1 * | 4/2012 | Shi | G05F 1/575 323/280 |
| 8,159,199 | B2 * | 4/2012 | Arnold | G06F 1/3203 323/269 |
| 8,258,766 | B1 * | 9/2012 | Sutardja | G05F 1/563 323/284 |
| 8,812,882 | B2 * | 8/2014 | Nguyen | G06F 1/26 713/300 |
| 8,957,644 | B2 * | 2/2015 | Mao | H02J 1/001 323/259 |
| 8,981,750 | B1 * | 3/2015 | Meher | G05F 1/56 323/282 |
| 9,075,422 | B2 * | 7/2015 | Vemula | G05F 1/573 |
| 9,190,988 | B1 * | 11/2015 | Gupta | H03K 3/012 |
| 9,444,338 | B1 * | 9/2016 | Pastorina | G05F 1/10 |
| 9,893,607 | B1 * | 2/2018 | Wan | H02M 1/36 |
| 9,933,801 | B1 * | 4/2018 | Guan | G05F 1/575 |
| 10,073,478 | B1 * | 9/2018 | Ivanov | G05F 1/595 |
| 10,411,599 | B1 * | 9/2019 | Shi | H02M 3/158 |
| 10,423,174 | B1 * | 9/2019 | Sonntag | H02M 3/158 |
| 10,466,765 | B2 * | 11/2019 | Jouin | G06F 1/3243 |
| 10,545,523 | B1 * | 1/2020 | Wu | G05F 1/565 |
| 10,560,107 | B1 * | 2/2020 | Patel | H03L 7/085 |
| 10,795,391 | B2 * | 10/2020 | Shankar | G05F 1/575 |
| 11,531,361 | B2 * | 12/2022 | Joshi | G05F 1/575 |
| 2003/0218454 | A1 * | 11/2003 | Cunnac | G05F 1/575 323/316 |
| 2004/0140845 | A1 * | 7/2004 | Eberlein | G05F 1/575 327/541 |
| 2005/0143045 | A1 * | 6/2005 | Jiguet | G05F 1/565 455/343.1 |
| 2006/0025104 | A1 * | 2/2006 | Reed | H02M 3/156 455/343.1 |
| 2006/0267562 | A1 * | 11/2006 | Szepesi | G05F 1/577 323/224 |
| 2007/0046271 | A1 * | 3/2007 | Zolfaghari | G05F 1/575 323/274 |
| 2007/0055896 | A1 * | 3/2007 | Er | G06F 1/3203 713/300 |
| 2007/0090815 | A1 * | 4/2007 | Hsieh | G05F 1/56 257/236 |
| 2007/0145830 | A1 | 6/2007 | Lee et al. | |
| 2007/0152647 | A1 * | 7/2007 | Liao | H02M 1/32 323/282 |
| 2007/0234095 | A1 * | 10/2007 | Chapuis | G06F 1/329 713/340 |
| 2008/0024108 | A1 * | 1/2008 | Jacob | G06F 1/26 323/349 |
| 2008/0054867 | A1 * | 3/2008 | Soude | G05F 1/575 323/282 |
| 2008/0076484 | A1 * | 3/2008 | Veselic | G06F 1/26 455/572 |
| 2008/0164765 | A1 * | 7/2008 | Illegems | G05F 1/56 307/80 |
| 2009/0039845 | A1 * | 2/2009 | Gerber | G05F 1/56 323/273 |
| 2009/0072807 | A1 * | 3/2009 | Qiu | H02M 3/156 323/285 |
| 2009/0167279 | A1 * | 7/2009 | Wei | H02J 1/102 323/304 |
| 2009/0309562 | A1 * | 12/2009 | Lipcsei | G05F 1/56 323/282 |
| 2010/0026250 | A1 * | 2/2010 | Petty | H02M 3/156 323/271 |
| 2011/0018507 | A1 * | 1/2011 | McCloy-Stevens | H02M 3/1588 323/271 |
| 2011/0309819 | A1 * | 12/2011 | Notani | G05F 1/10 323/314 |
| 2012/0206120 | A1 * | 8/2012 | Lipcsei | G05F 1/56 323/282 |
| 2013/0119954 | A1 * | 5/2013 | Lo | G05F 1/10 323/280 |
| 2013/0147271 | A1 * | 6/2013 | Yotsuji | G06F 1/26 307/75 |
| 2013/0162233 | A1 * | 6/2013 | Marty | H02M 3/158 323/274 |
| 2013/0169246 | A1 * | 7/2013 | Shao | G05F 1/563 323/266 |
| 2013/0271098 | A1 * | 10/2013 | Attianese | H02M 3/158 323/271 |
| 2013/0320942 | A1 * | 12/2013 | Vemula | G05F 1/573 323/265 |
| 2014/0068311 | A1 * | 3/2014 | Jenne | G06F 1/3265 713/340 |
| 2014/0077598 | A1 * | 3/2014 | Priel | G05F 1/56 307/31 |
| 2014/0117958 | A1 * | 5/2014 | Price | G05F 1/468 323/281 |
| 2014/0191742 | A1 * | 7/2014 | Kung | G05F 1/10 323/282 |
| 2014/0247027 | A1 * | 9/2014 | Kobayashi | G05F 1/595 323/271 |
| 2014/0266103 | A1 * | 9/2014 | Wang | G05F 1/565 323/275 |
| 2014/0266105 | A1 * | 9/2014 | Li | G05F 1/565 323/280 |

(56) References Cited

U.S. PATENT DOCUMENTS

2014/0309955 A1* 10/2014 Paul ........................ G01R 21/00 702/61
2014/0368176 A1* 12/2014 Mandal ................... G05F 1/575 323/280
2015/0022177 A1* 1/2015 Petrovic .................... G05F 1/56 323/303
2015/0061628 A1 3/2015 Nguyen et al.
2015/0137780 A1* 5/2015 Lerner .................... G05F 1/565 323/280
2015/0188408 A1* 7/2015 Huang .................. H02M 1/088 323/272
2015/0286232 A1* 10/2015 Parikh ........................ G05F 1/56 323/273
2016/0291619 A1* 10/2016 Guan ........................ G05F 1/56
2016/0291620 A1* 10/2016 Zhou ........................ G05F 1/575
2016/0334818 A1* 11/2016 Singh ........................ G05F 1/56
2017/0054356 A1* 2/2017 Wright .................... H02M 1/08
2017/0279359 A1* 9/2017 Goncalves .......... H02M 3/1584
2017/0322575 A1* 11/2017 Du .......................... G05F 1/575
2018/0032095 A1* 2/2018 Lee ......................... G05F 1/575
2018/0046211 A1* 2/2018 Vilas Boas ............. G05F 1/575
2018/0120879 A1* 5/2018 Du .......................... G05F 1/575
2018/0314282 A1* 11/2018 Tan ........................... G05F 3/30
2019/0064916 A1* 2/2019 Jouin .................... G06F 1/3243
2019/0079551 A1* 3/2019 Tourret ................... G05F 1/575
2019/0196525 A1* 6/2019 Zhou ....................... G05F 1/575
2019/0258283 A1* 8/2019 Pishdad .................. G05F 1/575
2019/0324483 A1* 10/2019 Tan ........................... G05F 1/10
2020/0310476 A1* 10/2020 Yoshioka ................ G05F 1/575
2020/0333873 A1* 10/2020 El Sherif ................ G06F 1/263
2020/0365193 A1* 11/2020 Koo ....................... G11C 16/30
2021/0124383 A1* 4/2021 Iguchi ..................... G05F 1/565
2021/0132644 A1* 5/2021 Chen ....................... G05F 3/262
2021/0333812 A1* 10/2021 Liu ......................... G05F 1/563
2021/0397207 A1* 12/2021 Joo ......................... G05F 1/575
2022/0066493 A1* 3/2022 Lin ......................... G05F 1/565
2022/0147082 A1* 5/2022 Melanson ............... G05F 1/565
2022/0187862 A1* 6/2022 Onódy ...................... G05F 1/59
2022/0197321 A1* 6/2022 Tiagaraj .................. G05F 1/575
2022/0229455 A1* 7/2022 Zhong ..................... G05F 1/461
2022/0365550 A1* 11/2022 Tsao ........................ G05F 1/575
2023/0350441 A1* 11/2023 Chiu ................... H02M 1/0025

* cited by examiner

VOLTAGE REGULATOR WAKE-UP

This application is a continuation of application Ser. No. 14/845,579, filed Sep. 4, 2015, which is incorporated herein by reference.

BACKGROUND

Many electronic systems include a voltage regulator. For example, battery powered devices often include a DC-DC voltage regulator to provide power at a different voltage than provided by the battery. In general, voltage regulators may be switching or linear. Advantages of linear regulators include low noise (no switching noise) and small size (no large inductors or transformers). One particular linear voltage regulator design is the Low-Drop-Out (LDO) regulator. One advantage of LDO regulators is that the minimum input/output differential voltage at which the regulator can no longer regulate (drop out voltage) is low, hence the name Low-Drop-Out. Another advantage of LDO regulators is a rapid response to a load change.

Many systems, particularly battery powered systems, are switched to a very-low-power sleep mode during periods of inactivity. When the system "wakes up" (comes out of sleep mode), the power supply sees an instantaneous change in load current from essentially zero load current to a large load current. Even though LDO regulators have a relatively fast response to a load change compared to other regulator designs, there is still a finite response time (called wake-up time) during which the output voltage and current may ring around their steady-state values over a finite settling time. In some LDO regulators, additional current (boost current) is supplied by a separate parallel path during wake-up time to reduce the response time. Switching in the boost current can cause voltage glitches and can increase the peak magnitude of output voltage ringing.

Some systems monitor power supply voltages and reset the system when a power supply voltage exceeds a certain range. Voltage ringing during wake-up and voltage glitches from boost current can cause a spurious system reset. A system reset can be catastrophic, for example, in a mission-critical computer system. Accordingly, to avoid spurious system resets, in some systems the voltage reset range is permanently fixed at a wide range such that expected worst case transients do not cause a reset. Alternatively, in some systems voltage monitoring is completely suspended during the entire wake-up period.

DETAILED DESCRIPTION

In the following discussion, a system is described having continuous monitoring of voltage regulator output but with variable power management thresholds for system reset. Relaxed thresholds are used during low power and wake-up when there may be glitches and ringing, and more stringent thresholds are used during normal operation.

Figure 1:
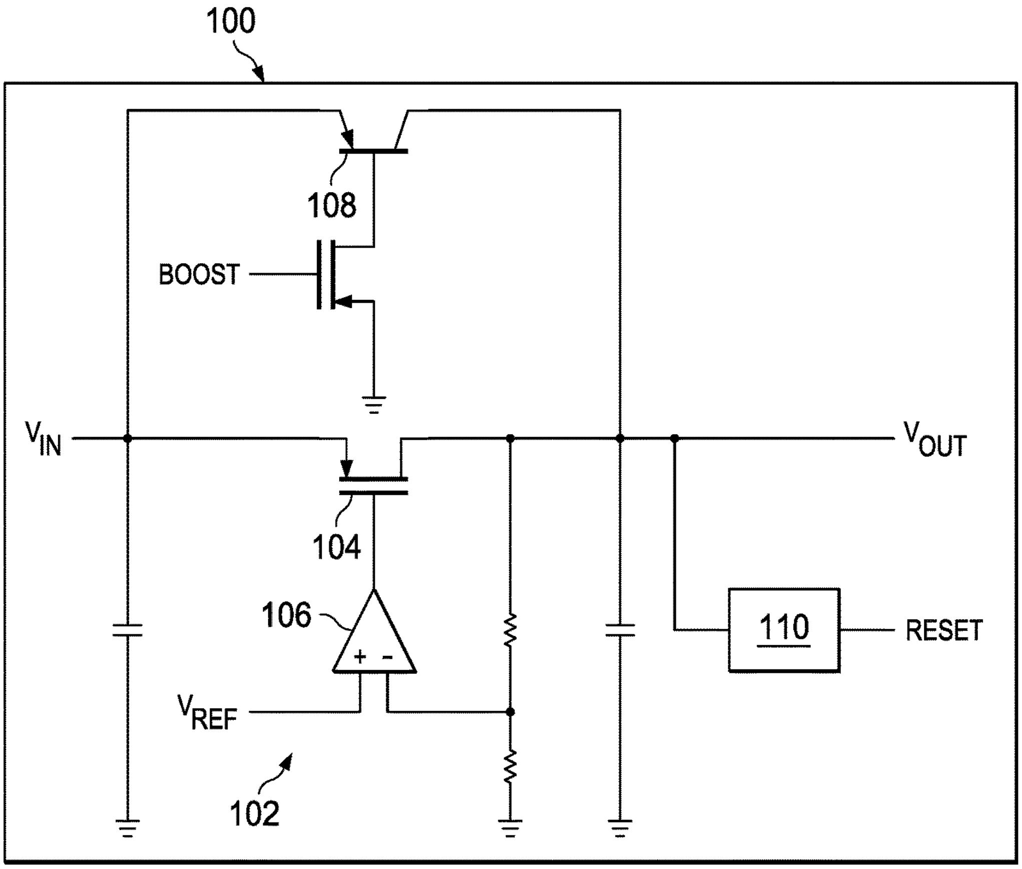
FIG. 1 is a block diagram schematic of an example embodiment of a system.

FIG. 1 shows part of a system 100 including an example voltage regulator 102. The example is simplified to facilitate discussion and illustration. In the example of FIG. 1, the voltage regulator 102 is a linear LDO regulator. The voltage regulator 102 includes a series transistor 104 (a power FET in the example of FIG. 1) driven by a feedback amplifier 106. The feedback amplifier 106 regulates the output voltage $V_{OUT}$ to equal a reference voltage $V_{REF}$. In addition (optionally), a transistor 108 is enabled by a BOOST signal to provide additional current (boost current) at the output of the voltage regulator 102 when there is a need to rapidly transition from a low load current to a high load current during wake-up.

The system 100 also shows a power management system 110. The power management system 110 generates a RESET signal to reset the system 100 when the output voltage $V_{OUT}$ is outside a specified range (above a high threshold or below a low threshold). The power management system 110 may also generate the BOOST signal.

Figure 2:
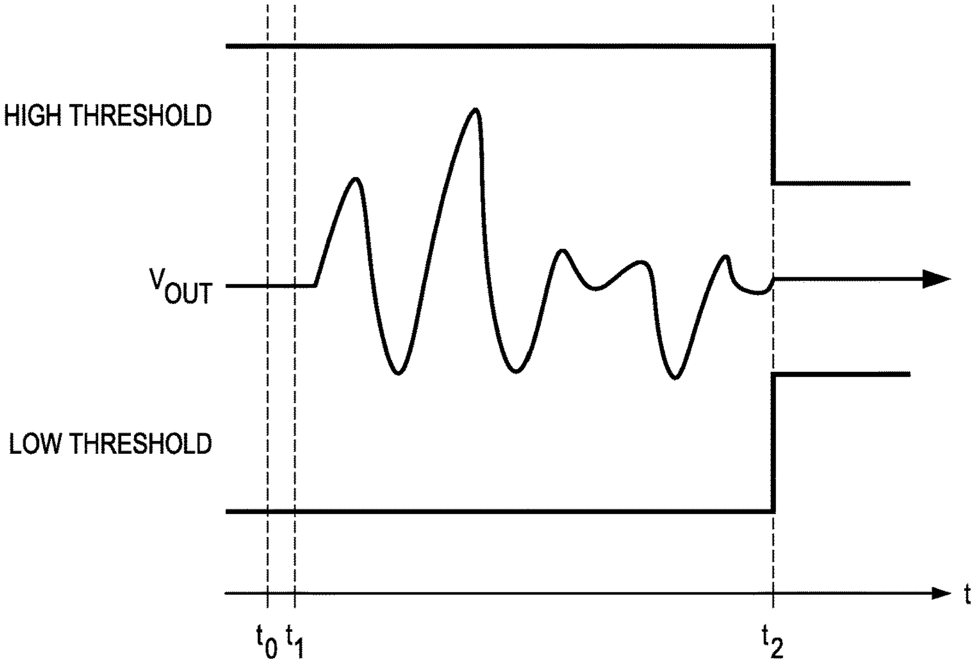
FIG. 2 is a timing diagram illustrating voltage output from a voltage regulator in the system of FIG. 1.

FIG. 2 is an example timing diagram for the system 100. At time to, the system 100 and the voltage regulator 102 are in a low-power sleep mode, the boost current transistor 108 is off, and the range between the LOW THRESHOLD and the HIGH THRESHOLD is set by the power management system 110 to set to be relatively high. At time $t_1$, the system 100 wakes up, and the voltage regulator 102 switches to a high power mode. If there is a boost current transistor 108, then at time $t_1$ the boost current transistor 108 is turned ON. During low power mode (before $t_0$), and during wake-up, the range between LOW THRESHOLD and HIGH THRESHOLD is set to be sufficiently high so that worst case ringing of $V_{OUT}$ will not trigger a system reset. At time $t_2$, the transient ringing of the output voltage $V_{OUT}$ has settled substantially and the range between the LOW THRESHOLD and HIGH THRESHOLD is set by the power management system 110 to be relatively low. If there is a boost current transistor 108 then the boost current transistor 108 is turned OFF at time $t_2$. The time period between $t_1$ and $t_2$ may be a predetermined fixed time based on expected worst case settling times.

In some prior art systems, the LOW THRESHOLD and HIGH THRESHOLD are fixed at levels to accommodate worst case $V_{OUT}$ transients and ringing, such as the levels shown between $t_1$ and $t_2$ in FIG. 2. Fixed thresholds reduce protection during normal operation after wake-up. In some prior art systems, power management is turned off during wake-up, which results in no protection during wake-up against harmful $V_{OUT}$ transients. In addition, if there is a period of no protection, there is an opportunity for possible system tampering or attack. The system illustrated in FIGS. 1 and 2 is more robust, providing continuous power management (to protect against harmful transients during wake-up and to protect against tampering or attack), with relaxed thresholds during low power and wake-up (to avoid spurious resets), and more stringent thresholds during normal operation (to provide improved protection during normal operation).

Figure 3:
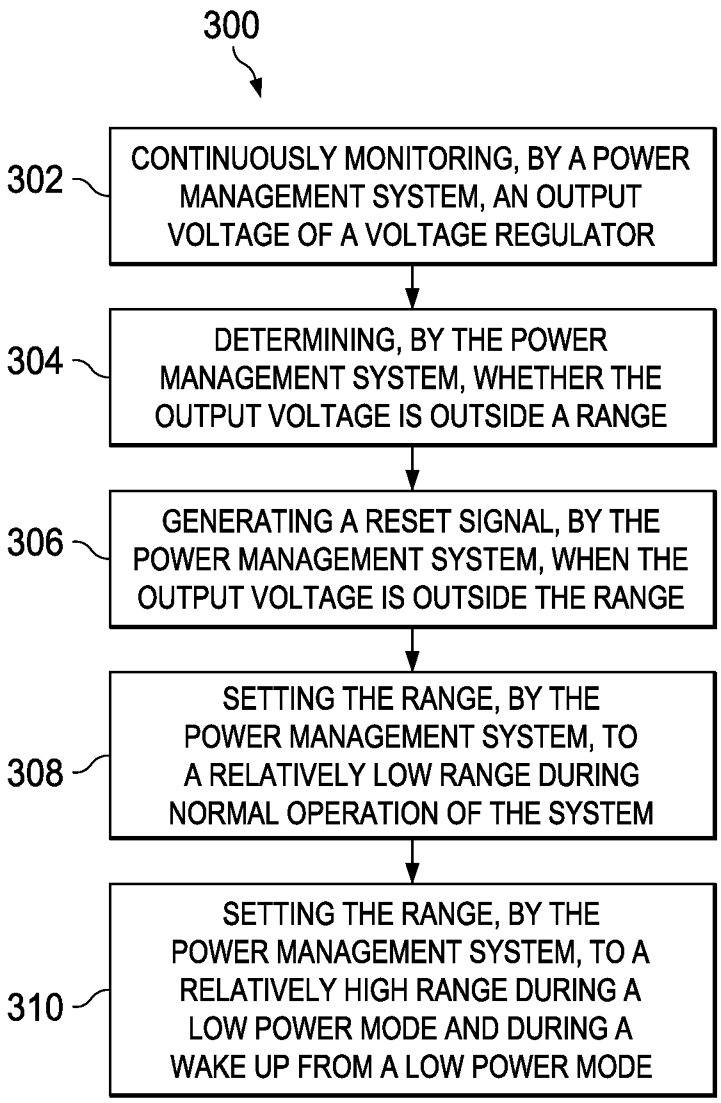
FIG. 3 is a flow chart for a method of managing power to a system.

FIG. 3 is a flow chart for a method 300 of managing power to a system. At step 302, a power management system continuously monitors an output voltage of a voltage regulator. At step 304, the power management system determines whether the output voltage is outside a range. At step 306, the power management system generates a reset signal when the output voltage is outside the range. At step 308, the power management system sets the range to a relatively low range during normal operation of the system. At step 310, the power management system sets the range to a relatively high range during a low power mode and during a wake-up from a low power mode.

What is claimed is:

1. A system comprising:

a voltage regulator operable to provide an output voltage at an output of the voltage regulator;

a current supply coupled to the voltage regulator and operable to provide an additional current to the output of the voltage regulator; and a power management system, coupled to the voltage regulator, operable to:

set a voltage range that is associated with resetting the voltage regulator to a first range during a period in which the voltage regulator switches from a low power mode to a high power mode, wherein the first range extends from a first low threshold to a first high threshold; and set the voltage range to a second range after the voltage regulator switches to the high power mode, wherein the second range extends from a second low threshold to a second high threshold, and wherein the second range is narrower than the first range.

2. The system of claim 1, in which the voltage regulator is a linear voltage regulator.

3. The system of claim 1, wherein the second low threshold is larger than the first low threshold, the second high threshold is less than the first high threshold, or a combination thereof.

4. The system of claim 1, wherein the low power mode corresponds to a sleep mode of the voltage regulator.

5. The system of claim 1, wherein the high power mode corresponds to normal operation of the voltage regulator.

6. The system of claim 1, wherein the voltage regulator comprises:

an input;

a transistor having a control terminal, a first current terminal coupled to the input, and a second current terminal coupled to the output;

an amplifier having a first input, a second input configured to be coupled to a reference voltage, and an output coupled to the control terminal of the transistor;

a first resistor having a first terminal coupled to the second current terminal of the transistor and to the output and a second terminal coupled to the first input of the amplifier; and a second resistor having a first terminal coupled to the first input of the amplifier and to the second terminal of the first resistor and a second terminal coupled to ground.

7. The system of claim 6, wherein the current supply comprises:

a second transistor having a first terminal, and a second terminal coupled to ground; and a third transistor having a first terminal coupled to the input, a second terminal coupled to the output, and a control terminal coupled to the first terminal of the second transistor.

8. The system of claim 1, wherein the power management system is operable to enable the current supply to provide the additional current during the period in which the voltage regulator switches from the low power mode to the high power mode.

9. A system, comprising:

a voltage regulator configured to generate an output voltage; and a power management system coupled to the voltage regulator and configured to:

based on a determination that the voltage regulator operates in a period to switch from a low power mode to a high power mode, determine a monitoring range to be a first range extending from a first low threshold to a first high threshold;

based on a determination that the voltage regulator operates in the high power mode, determine the monitoring range to be a second range extending from a second low threshold to a second high threshold, wherein the second range is narrower than the first range;

determine whether the output voltage is within the monitoring range; and generate a signal to reset the voltage regulator based on a determination that the output voltage is outside the monitoring range.

10. The system of claim 9, wherein the low power mode corresponds to a sleep mode of the voltage regulator.

11. A system comprising:

a voltage regulator operable to provide an output voltage at an output of the voltage regulator;

a current supply coupled to the voltage regulator and operable to provide an additional current to the output of the voltage regulator; and a power management system coupled to the voltage regulator and operable to:

set a voltage range that is associated with resetting the voltage regulator to a first range during a period in which the voltage regulator switches from a low power mode to a high power mode, wherein the first range extends from a first low threshold to a first high threshold; and set the voltage range to a second range after the voltage regulator switches to the high power mode, wherein the second range extends from a second low threshold to a second high threshold, and wherein the second range is narrower than the first range.

12. The system of claim 9, wherein the high power mode corresponds to normal operation of the voltage regulator.

13. The system of claim 11, wherein the second low threshold is larger than the first low threshold, the second high threshold is less than the first high threshold, or a combination thereof.

14. The system of claim 11, wherein the low power mode corresponds to a sleep mode of the voltage regulator.

15. The system of claim 14, wherein the high power mode corresponds to normal operation of the voltage regulator.

16. The system of claim 9, wherein the voltage regulator is a linear voltage regulator.

17. The system of claim 11, in which the voltage regulator is a linear voltage regulator.

18. The system of claim 11, wherein the power management system is operable to enable the current supply to provide the additional current during the period in which the voltage regulator switches from the low power mode to the high power mode.

19. The system of claim 11, wherein the voltage regulator comprises:

an input;

a transistor having a control terminal, a first current terminal coupled to the input, and a second current terminal coupled to the output;

an amplifier having a first input, a second input configured to be coupled to a reference voltage, and an output coupled to the control terminal of the transistor;

a first resistor having a first terminal coupled to the second current terminal of the transistor and to the output and a second terminal coupled to the first input of the amplifier; and a second resistor having a first terminal coupled to the first input of the amplifier and to the second terminal of the first resistor and a second terminal coupled to ground.

20. The system of claim 19, wherein the current supply comprises:

a second transistor having a first terminal, and a second terminal coupled to ground; and a third transistor having a first terminal coupled to the input, a second terminal coupled to the output, and a control terminal coupled to the first terminal of the second transistor.

* * * * *